United States Patent
Zhang et al.

(10) Patent No.: US 10,360,807 B2
(45) Date of Patent: Jul. 23, 2019

(54) MOBILE MEDIA CREATION FROM ANY CONTENT

(71) Applicant: Microsoft Technology Licensing, LLC, Redmond, WA (US)

(72) Inventors: Fan Zhang, Redmond, WA (US); Randy Davis, Redmond, WA (US); Ashwini Purohit, Seattle, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 226 days.

(21) Appl. No.: 15/336,032

(22) Filed: Oct. 27, 2016

(65) Prior Publication Data

US 2018/0122252 A1 May 3, 2018

(51) Int. Cl.
*G09B 5/06* (2006.01)

(52) U.S. Cl.
CPC ..................... *G09B 5/06* (2013.01)

(58) Field of Classification Search
CPC .................... G09B 7/00; G09B 5/00
See application file for complete search history.

(56) References Cited

U.S. PATENT DOCUMENTS

| 9,342,820 | B2 | 5/2016 | Vidalenc et al. | |
| 2010/0151431 | A1* | 6/2010 | Miller | G09B 5/00 434/350 |
| 2013/0031208 | A1* | 1/2013 | Linton | G09B 7/02 709/217 |
| 2013/0191445 | A1* | 7/2013 | Gayman | H04L 67/36 709/203 |
| 2013/0254656 | A1 | 9/2013 | Florian | |
| 2014/0101182 | A1 | 4/2014 | Roy et al. | |
| 2014/0120511 | A1* | 5/2014 | Hall | G09B 5/14 434/350 |
| 2014/0147825 | A1 | 5/2014 | Xakellis | |
| 2015/0118672 | A1 | 4/2015 | Yeskel et al. | |

(Continued)

OTHER PUBLICATIONS

"Schoology", https://support.schoology.com/hc/en-us/articles/201001323-How-do-students-submit-assignments-, Retrieved Date Sep. 21, 2016, 3 pages.

(Continued)

*Primary Examiner* — Jason Skaarup

(57) ABSTRACT

In non-limiting examples, media can be created from any type of existing content. An exemplary media may be an assignment media (e.g. document) that is created for educational purposes. Content that is unassociated with a learning management system may be accessed. Input may be received requesting creation of an assignment media based on the accessed content. The request may be received through a learning management application, where the assignment media may be created based on the received input. Creation of an assignment media automatically associates the assignment media with a user account of a learning management application and a distributed network storage that corresponds with the user account. In some examples, the created assignment media may comprise one or more portions of the accessed content. The created assignment media may be accessed through the learning management application. Other examples are also described.

20 Claims, 11 Drawing Sheets

(56) References Cited

U.S. PATENT DOCUMENTS

2015/0332596 A1* 11/2015 Applehans .............. G09B 5/00
434/309
2016/0188177 A1 6/2016 Lynch et al.

OTHER PUBLICATIONS

"Submit an Assignment" https://support.google.com/edu/classroom/answer/6020285?co=GENIE.Platform%3DDesktop&hl=en, Retrieved Date Sep. 21, 2016, 2 pages.
"Instruct Your Students to Submit an Assignment (Teacher)", https://support.edmodo.com/hc/en-us/articles/205004514-Instruct-Your-Students-to-Submit-an-Assignment-Teacher-, Retrieved Date Sep. 21, 2016, 3 pages.
"How do I submit an online assignment?", https://guides.instructure.com/m/4212/I/41972-how-do-i-submit-an-online-assignment, Retrieved Date Sep. 21, 2016, 3 pages.
"Create or modify an assignment", https://support.google.com/edu/classroom/answer/6020265?co=GENIE.Platform%3DDesktop&hl=en, Retrieved Date Sep. 21, 2016, 2 pages.

* cited by examiner

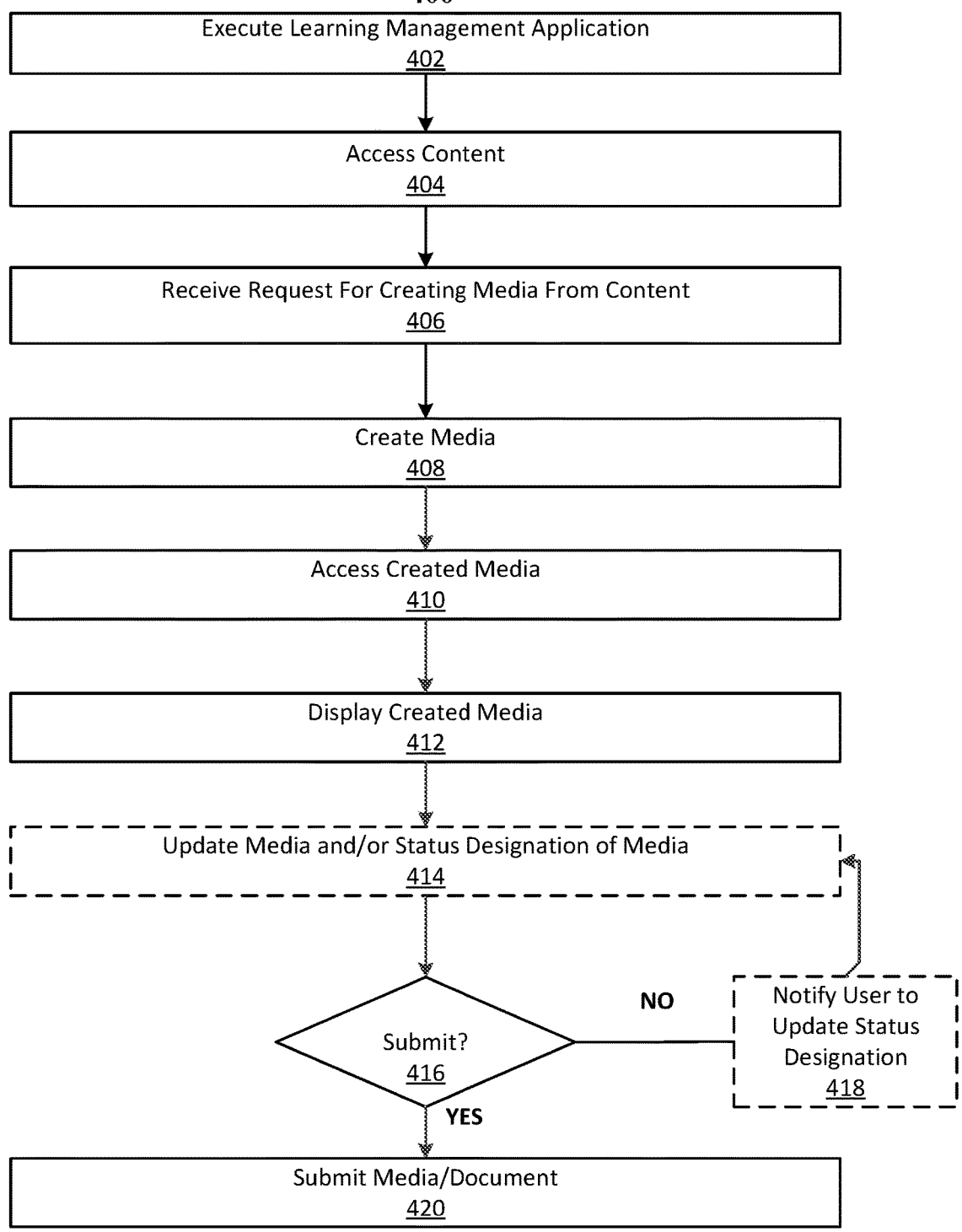

500

520

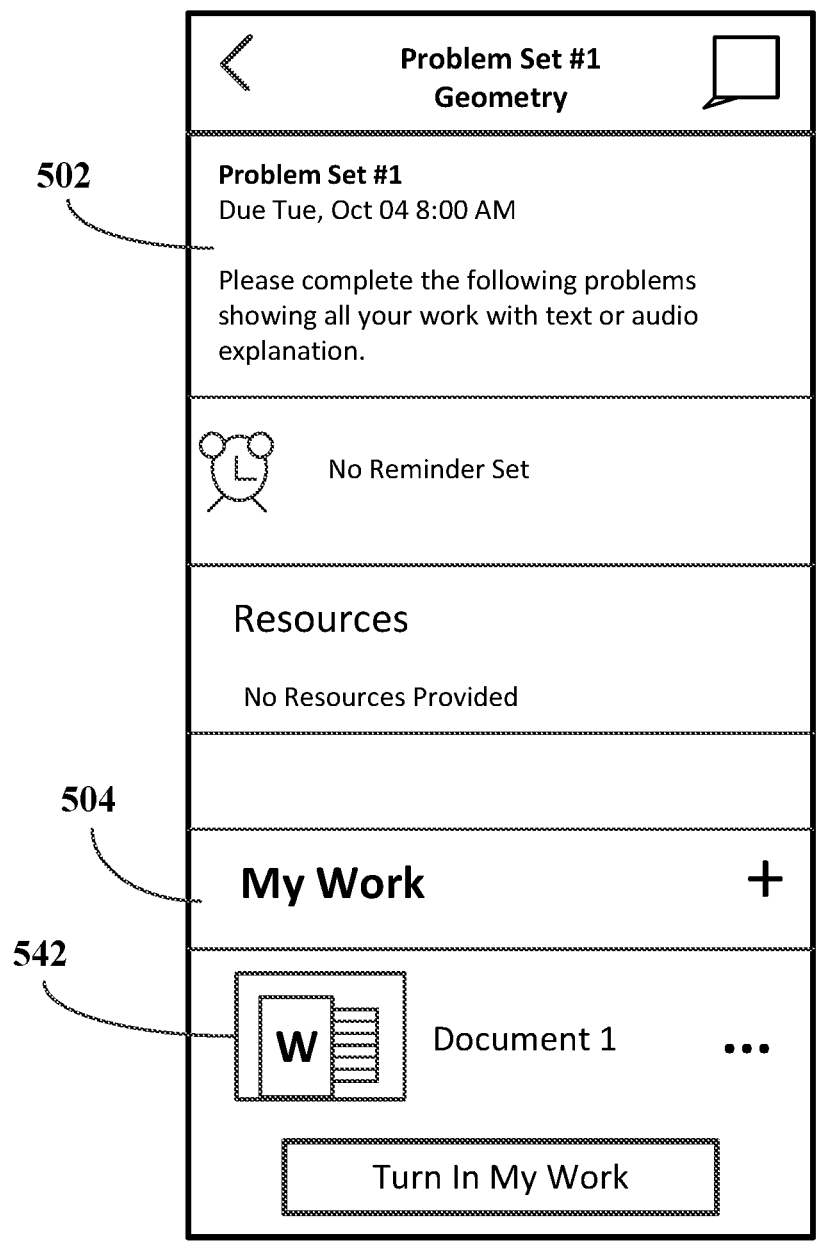

550

600

MOBILE MEDIA CREATION FROM ANY CONTENT

BACKGROUND

Currently, learning management systems are being implemented that enable teachers/professors and students to communicate regarding course content and assignments. While learning management systems provide an organized way to create and manage coursework content, typical learning management systems are limited in that a user needs to be logged in and associated with a particular class/course to access or create content for assignments. This makes it difficult to account for the numerous instances where assignments are made in an ad hoc manner. For example, if a teacher writes an assignment on a board, it is up to the student to note the assignment and separately create an assignment for submission. In that example, if the student wants to note what the teacher writes on the board or says in class, the student needs to login to the learning management system, access a particular course and manually add a note or posting to the learning management system. The student would then have to go back, review a note/posting, and separately create another document for submission.

Another issue that arises with typical learning management systems is that, a teacher/professor, rather than a student, is typically responsible for creation of documents for an assignment. A student may access, complete and submit a teacher-created document for an assignment. However, this limits flexibility for students when it comes to creating and managing documents used for completion of assignments.

As such, examples of the present application are directed to the general technical environment related to improving the creation and management of documents that can be utilized for educational purposes, among other examples.

SUMMARY

In non-limiting examples, media can be created from any type of existing content. An exemplary media may be an assignment media (e.g. document) that is created for educational purposes. Content that is unassociated with a learning management system may be accessed. Input may be received requesting creation of an assignment media based on the accessed content. The request may be received through a learning management application, where the assignment media may be created based on the received input. Creation of an assignment media automatically associates the assignment media with a user account of a learning management application and a distributed network storage that corresponds with the user account. In some examples, the created assignment media may comprise one or more portions of the accessed content. The created assignment media may be accessed through the learning management application. The created assignment media may be displayed in a productivity application, for example, based on an access request for the assignment media.

In other non-limiting examples, assignment media can be created over a distributed network. Consider an example where a media being created is a document for a homework assignment or other educational purpose. A request may be received for creation of an assignment document based on content that is unassociated with a learning management system. The assignment document may be created based on the received request. Creation of an assignment document automatically associates the assignment document with a user account of a learning management application and a distributed network storage that corresponds with the user account. The created assignment document may comprise one or more portions of the content. Access to the created assignment document may be provided through the learning management application. When the assignment document is updated, a copy of the assignment document stored on the distributed network storage of the user may be updated enabling a user to work on the assignment document remotely and from any location or device.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

FIG. 4 is an exemplary method related to assignment media creation on a client device with which aspects of the present disclosure may be practiced.

FIGS. 5A-5E provide user interface views for an exemplary learning management application with which aspects of the present disclosure may be practiced.

DETAILED DESCRIPTION

Figure 1:
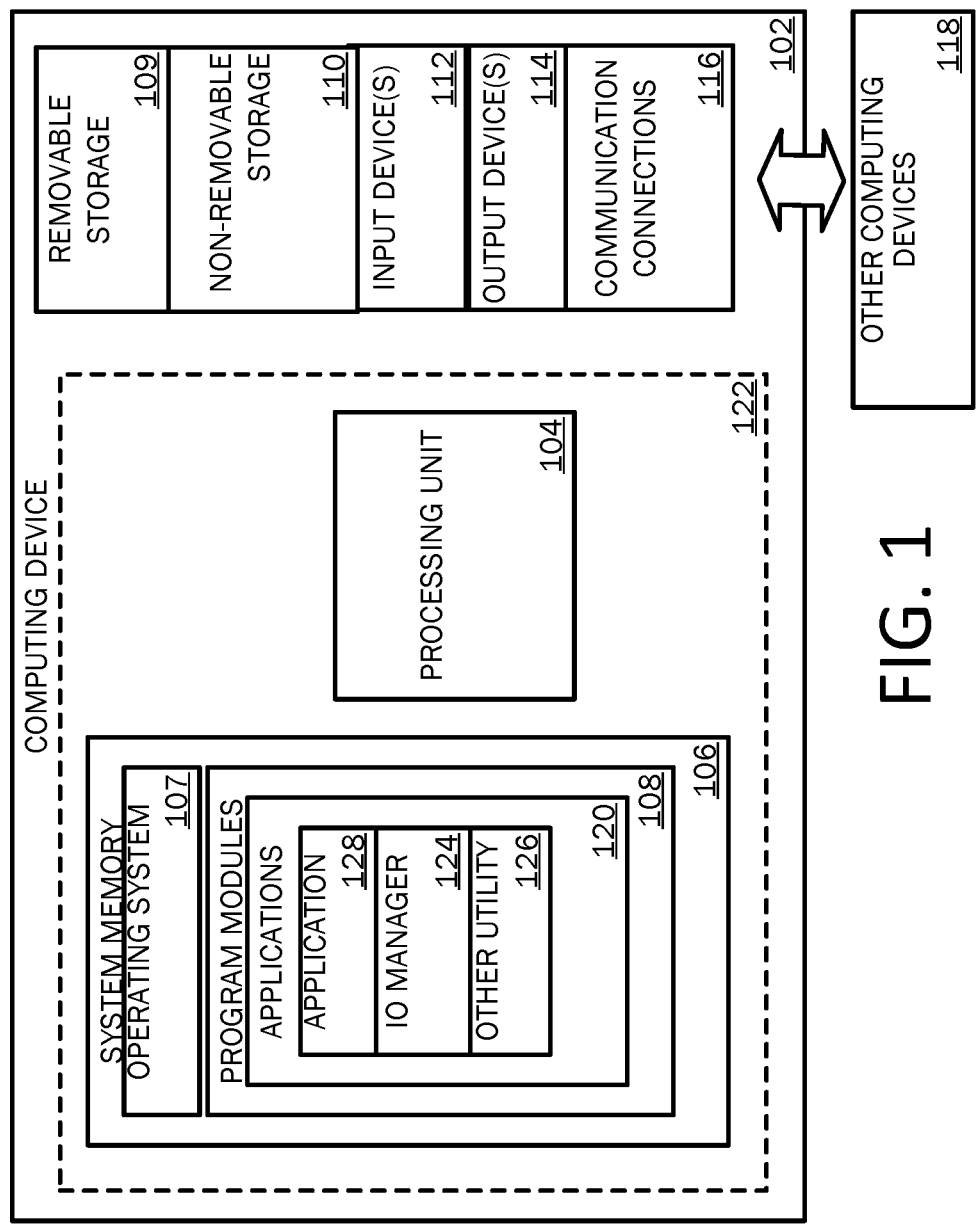
FIG. 1 is a block diagram illustrating an example of a computing device with which aspects of the present disclosure may be practiced.

Learning management systems are being implemented that enable teachers/professors and students to communicate regarding course content and assignments. A learning management system is an application/service for delivery of electronic education content, where content for educational courses can be administered, documented, tracked and reported. Learning management systems may organize educational content by course. Management of coursework through a learning management system requires a user to be in a specific course within a learning management system, which can present challenges when content is provided in a medium that is outside of a learning management system.

Examples described herein allow students to take initiative and create media for their homework directly from any computing device including but not limited to mobile devices. Students can take any type of content, including content that is unassociated with a learning management system and create a media (e.g. document) that can be submitted for an assignment, for example, through a learning management application. A learning management application is an application/service that manages content for educational purposes. An exemplary learning management application may be associated with (or an extension of) a learning management system. Assignment media may be any type of content that is created for educational purposes. Exemplary assignment media may be a document (e.g. assignment document) created from existing content that may not already be affiliated with a learning management system/application. For ease of explanation, examples described herein may reference an assignment document. However, one skilled in the art that understands the present disclosure should recognize that any type of media (e.g. images, audio files, etc.) can be affiliated with the examples described herein.

Creation of an assignment document from content outside of a learning management system may comprise processing operations that automatically associate an assignment document that is being created with a user account of a learning management application and a distributed network storage that corresponds with the user account. Users can more efficiently create assignment documents and associate an assignment document with a learning management system/ application without having to first create a document outside of a learning management system and then upload/attach the document into a specific course profile of a learning management system/application. Additionally, examples described herein automatically associate created assignment documents with a distributed network storage service that can provide a cloud-based copy of an assignment document. The cloud-based copy of an assignment document can be accessed from anywhere using any device of a user, providing additional flexibility and backup of documents for a student.

Moreover, examples described herein are configured to incorporate content that is unassociated with a learning management system directly into a created assignment media. For example, a question posed by a professor through email or text message can be used by a student to generate an assign document. The created assignment document may include the question (as well as additional content or resources based on the question). In another example, a student may take a picture of a blackboard/whiteboard, which can be utilized to create an assignment document. In that example, the picture and/or content of the picture can be incorporated into the created assignment document. In examples, processing operations may be applied to analyze accessed content using one or more resources associated with a platform. A platform may comprise a plurality of resources (e.g. different applications/services, knowledge resources, social network services, etc.) that can be used to improve processing of an exemplary learning management application, for example, during creation of media for educational purposes. Resources of a platform may interface with a device that is accessing content, for example, where the interfacing may occur over a network connection and/or through applications/services installed locally on the device.

Furthermore, examples described herein provide an exemplary learning management application/service that can interface with other platform resources, for example, provided by a technology company (e.g. MICROSOFT, GOOGLE, APPLE, IBM, AMAZON, etc.). As described above, an exemplary learning management application may interface with a distributed network storage service to provide distributed network storage for created assignment media. In examples, the distributed network storage service may be configured to enable users to create folders and/or specific drives for education content associated with particular courses. In other examples, an exemplary leaning management application may interface with one or more productivity applications. A productivity application is an application that is usable to view content and/or create new media such as files/documents. Examples of productivity applications include but are not limited to suite applications such as the Microsoft Office® application suite, email applications, messaging applications, social network applications, etc. Functionality of an exemplary learning management application can be extended to productivity applications, where user interface controls associated with an exemplary learning management application may be included with an application command control for a productivity application.

While examples described herein reference creation of assignment media for educational purposes, one skilled in the art that understands the present disclosure should recognize that examples described herein can extend to any type of media creation and management.

Accordingly, the present disclosure provides a plurality of technical advantages including but not limited to: improved learning management systems/applications, extensibility to integrate processing of a variety of different applications/ services to improve functionality of a learning management system/application, improved user interaction with learning management systems/applications, more efficient operation of processing devices (e.g., saving computing cycles/computing resources) during creation and management of media and ability to create educational assignment documents from any type of content, among other examples.

Figure 2A:
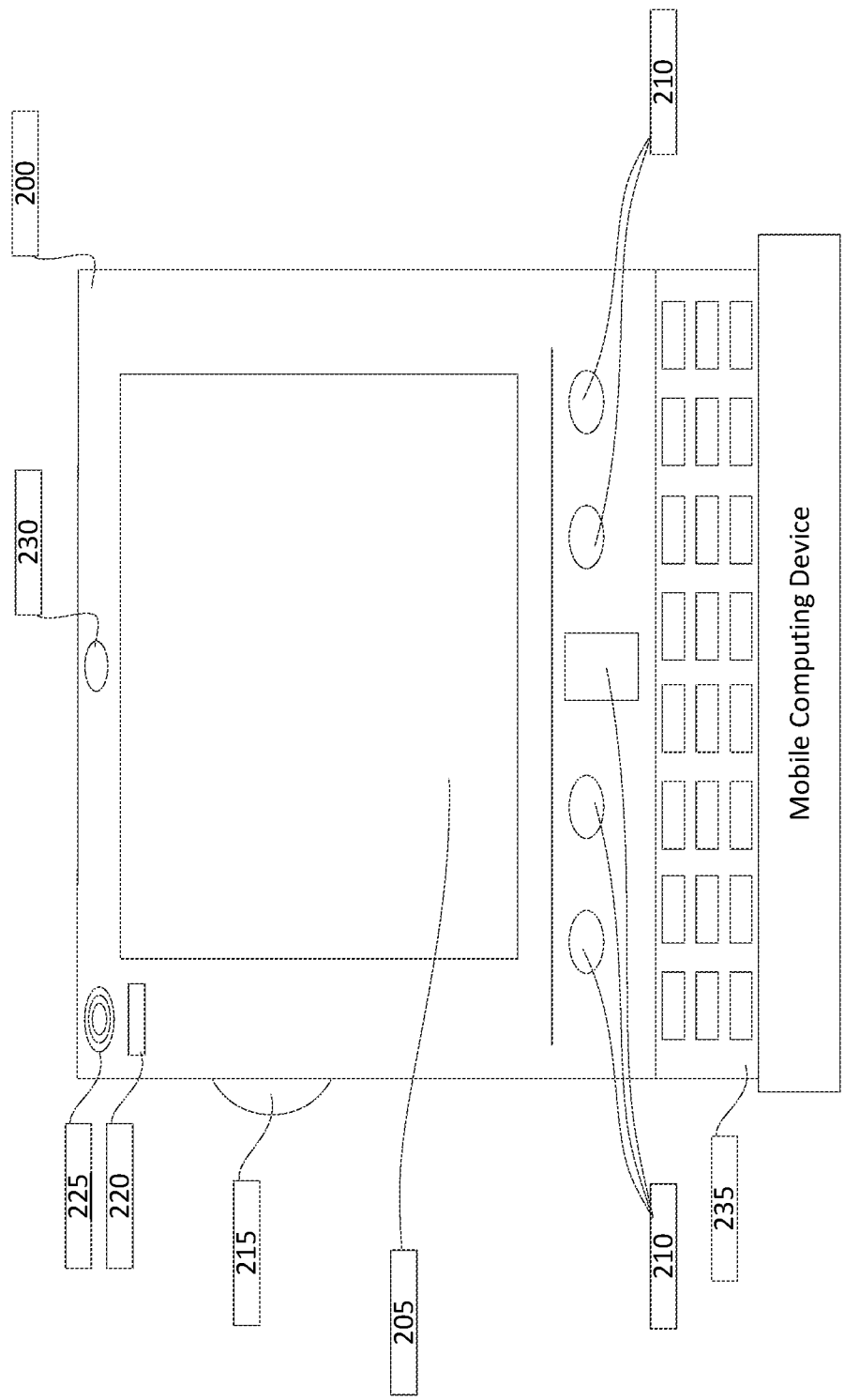
FIGS. 2A and 2B are simplified block diagrams of a mobile computing device with which aspects of the present disclosure may be practiced.
Figure 2B:
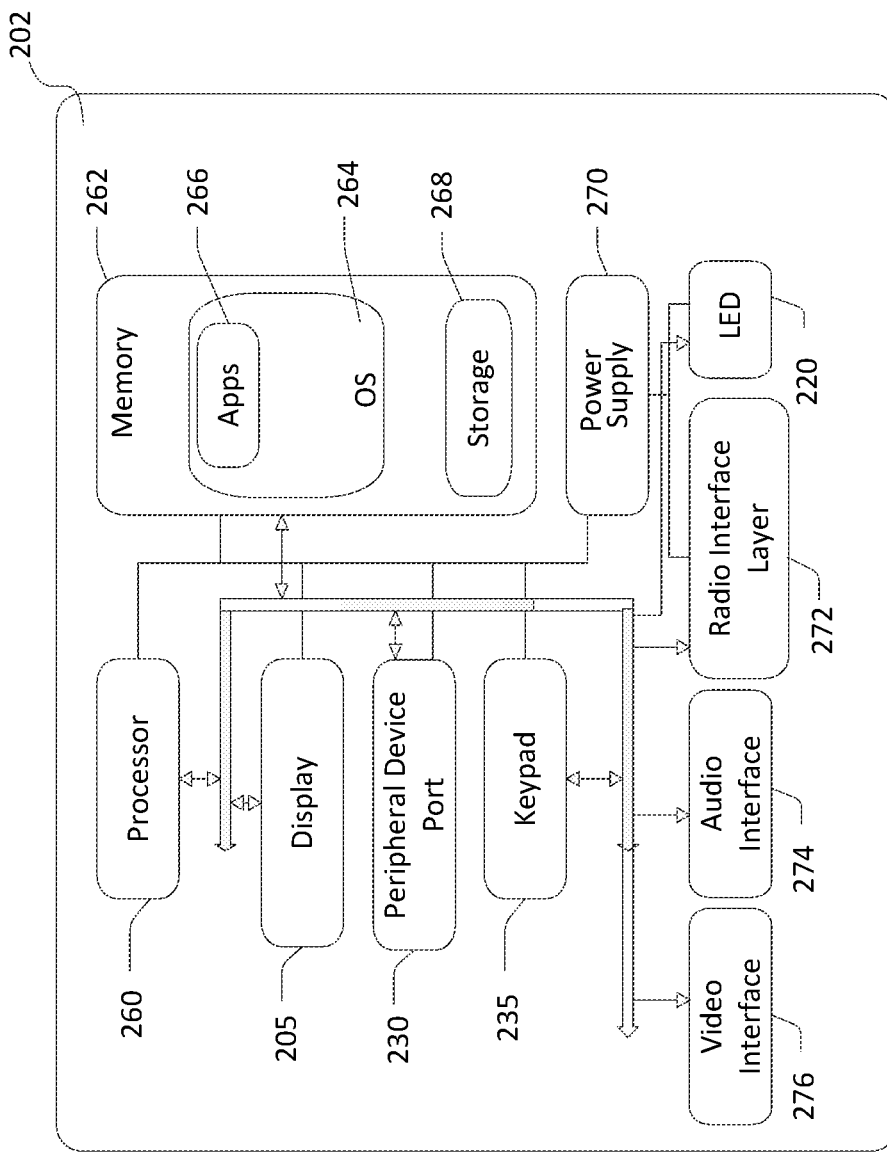
Figure 3:
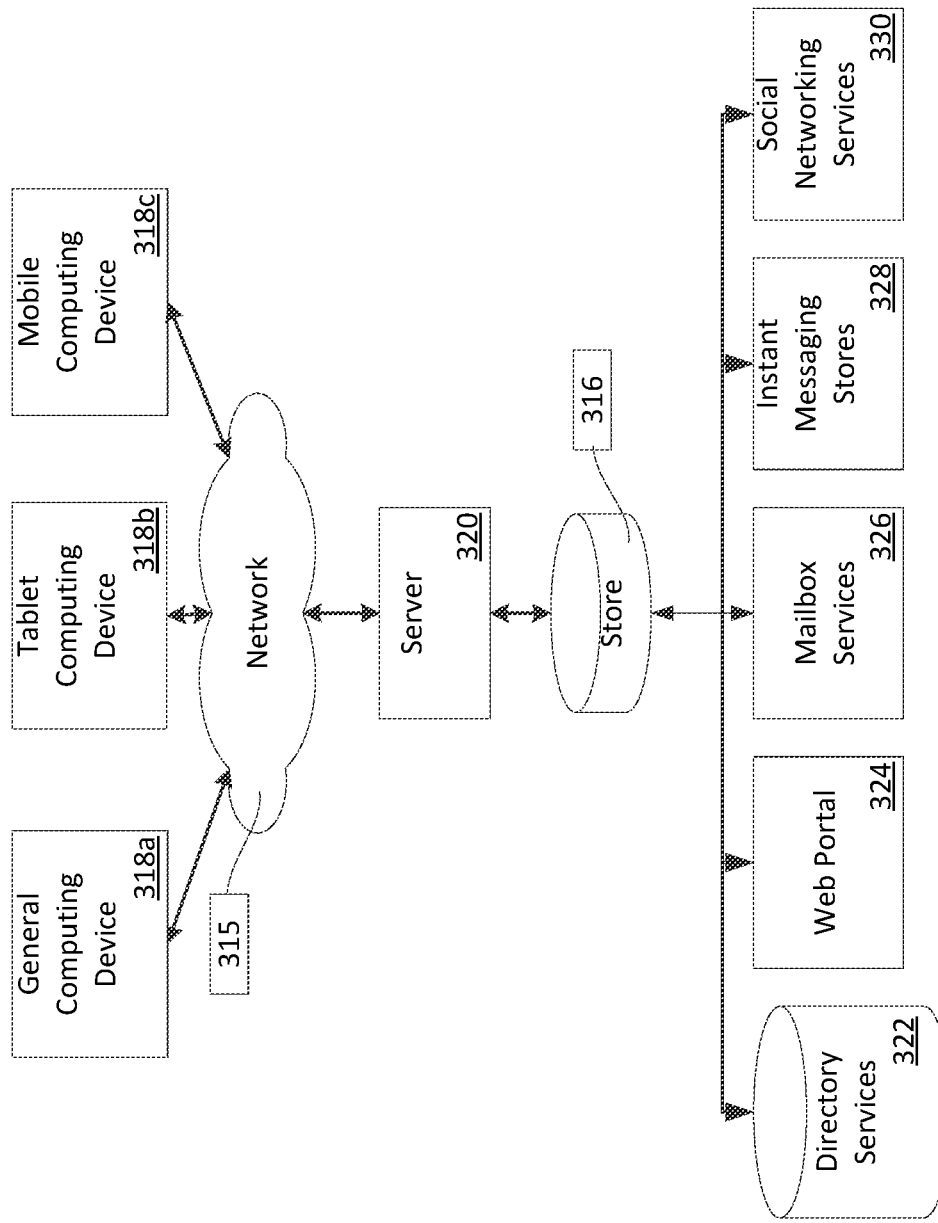
FIG. 3 is a simplified block diagram of a distributed computing system in which aspects of the present disclosure may be practiced.

FIGS. 1-3 and the associated descriptions provide a discussion of a variety of operating environments in which examples of the invention may be practiced. However, the devices and systems illustrated and discussed with respect to FIGS. 1-3 are for purposes of example and illustration and are not limiting of a vast number of computing device configurations that may be utilized for practicing examples of the invention, described herein.

FIG. 1 is a block diagram illustrating physical components of a computing device 102, for example a mobile processing device, with which examples of the present disclosure may be practiced. Among other examples, computing device 102 may be an exemplary computing device configured for processing that extends functionality of an exemplary learning management application. In a basic configuration, the computing device 102 may include at least one processing unit 104 and a system memory 106. Depending on the configuration and type of computing device, the system memory 106 may comprise, but is not limited to, volatile storage (e.g., random access memory), non-volatile storage (e.g., read-only memory), flash memory, or any combination of such memories. The system memory 106 may include an operating system 107 and one or more program modules 108 suitable for running software programs/modules 120 such as IO manager 124, other utility 126 and application 128. As examples, system memory 106 may store instructions for execution. Other examples of system memory 106 may store data associated with applications. The operating system 107, for example, may be suitable for controlling the operation of the computing device 102. Furthermore, examples of the invention may be practiced in conjunction with a graphics library, other operating systems, or any other application program and is not limited to any particular application or system. This basic configuration is illustrated in FIG. 1 by those components within a dashed line 122. The computing device 102 may have additional features or functionality. For example, the computing device 102 may also include additional data storage devices (removable and/or non-removable) such as, for example, magnetic disks, optical disks, or tape. Such additional storage is illustrated in FIG. 1 by a removable storage device 109 and a non-removable storage device 110.

As stated above, a number of program modules and data files may be stored in the system memory 106. While executing on the processing unit 104, program modules 108 (e.g., Input/Output (I/O) manager 124, other utility 126 and application 128) may perform processes including, but not limited to, one or more of the stages of the operations described throughout this disclosure. Other program modules that may be used in accordance with examples of the present invention may include electronic mail and contacts applications, word processing applications, spreadsheet applications, database applications, slide presentation applications, drawing or computer-aided application programs, photo editing applications, authoring applications, etc.

Furthermore, examples of the invention may be practiced in an electrical circuit comprising discrete electronic elements, packaged or integrated electronic chips containing logic gates, a circuit utilizing a microprocessor, or on a single chip containing electronic elements or microprocessors. For example, examples of the invention may be practiced via a system-on-a-chip (SOC) where each or many of the components illustrated in FIG. 1 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality described herein may be operated via application-specific logic integrated with other components of the computing device 102 on the single integrated circuit (chip). Examples of the present disclosure may also be practiced using other technologies capable of performing logical operations such as, for example, AND, OR, and NOT, including but not limited to mechanical, optical, fluidic, and quantum technologies. In addition, examples of the invention may be practiced within a general purpose computer or in any other circuits or systems.

The computing device 102 may also have one or more input device(s) 112 such as a keyboard, a mouse, a pen, a sound input device, a device for voice input/recognition, a touch input device, etc. The output device(s) 114 such as a display, speakers, a printer, etc. may also be included. The aforementioned devices are examples and others may be used. The computing device 104 may include one or more communication connections 116 allowing communications with other computing devices 118. Examples of suitable communication connections 116 include, but are not limited to, RF transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 106, the removable storage device 109, and the non-removable storage device 110 are all computer storage media examples (i.e., memory storage.) Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 102. Any such computer storage media may be part of the computing device 102. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 2A and 2B illustrate a mobile computing device 200, for example, a mobile telephone, a smart phone, a personal data assistant, a tablet personal computer, a phablet, a slate, a laptop computer, and the like, with which examples of the invention may be practiced. Mobile computing device 200 may be an exemplary computing device configured for processing that extends functionality of an exemplary learning management application. Application command control may be provided for applications executing on a computing device such as mobile computing device 200. Application command control relates to presentation and control of commands for use with an application through a user interface (UI) or graphical user interface (GUI). In one example, application command controls may be programmed specifically to work with a single application. In other examples, application command controls may be programmed to work across more than one application. With reference to FIG. 2A, one example of a mobile computing device 200 for implementing the examples is illustrated. In a basic configuration, the mobile computing device 200 is a handheld computer having both input elements and output elements. The mobile computing device 200 typically includes a display 205 and one or more input buttons 210 that allow the user to enter information into the mobile computing device 200. The display 205 of the mobile computing device 200 may also function as an input device (e.g., touch screen display). If included, an optional side input element 215 allows further user input. The side input element 215 may be a rotary switch, a button, or any other type of manual input element. In alternative examples, mobile computing device 200 may incorporate more or less input elements. For example, the display 205 may not be a touch screen in some examples. In yet another alternative example, the mobile computing device 200 is a portable phone system, such as a cellular phone. The mobile computing device 200 may also include an optional keypad 235. Optional keypad 235 may be a physical keypad or a "soft" keypad generated on the touch screen display or any other soft input panel (SIP). In various examples, the output elements include the display 205 for showing a GUI, a visual indicator 220 (e.g., a light emitting diode), and/or an audio transducer 225 (e.g., a speaker). In some examples, the mobile computing device 200 incorporates a vibration transducer for providing the user with tactile feedback. In yet another example, the mobile computing device 200 incorporates input and/or output ports, such as an audio input (e.g., a microphone jack), an audio output (e.g., a headphone jack), and a video output (e.g., a HDMI port) for sending signals to or receiving signals from an external device.

FIG. 2B is a block diagram illustrating the architecture of one example of a mobile computing device. That is, the mobile computing device 200 can incorporate a system (i.e., an architecture) 202 to implement some examples. In one examples, the system 202 is implemented as a "smart phone" capable of running one or more applications (e.g., browser, e-mail, calendaring, contact managers, messaging clients, games, and media clients/players). In some examples, the system 202 is integrated as a computing device, such as an integrated personal digital assistant (PDA), tablet and wireless phone.

One or more application programs 266 may be loaded into the memory 262 and run on or in association with the operating system 264. Examples of the application programs include phone dialer programs, e-mail programs, personal information management (PIM) programs, word processing programs, spreadsheet programs, Internet browser programs, messaging programs, and so forth. The system 202 also includes a non-volatile storage area 268 within the memory 262. The non-volatile storage area 268 may be used to store persistent information that should not be lost if the system 202 is powered down. The application programs 266 may use and store information in the non-volatile storage area 268, such as e-mail or other messages used by an e-mail application, and the like. A synchronization application (not shown) also resides on the system 202 and is programmed to interact with a corresponding synchronization application resident on a host computer to keep the information stored in the non-volatile storage area 268 synchronized with corresponding information stored at the host computer. As should be appreciated, other applications may be loaded into the memory 262 and run on the mobile computing device (e.g. system 202) described herein.

The system 202 has a power supply 270, which may be implemented as one or more batteries. The power supply 270 might further include an external power source, such as an AC adapter or a powered docking cradle that supplements or recharges the batteries.

The system 202 may include peripheral device port 230 that performs the function of facilitating connectivity between system 202 and one or more peripheral devices. Transmissions to and from the peripheral device port 230 are conducted under control of the operating system (OS) 264. In other words, communications received by the peripheral device port 230 may be disseminated to the application programs 266 via the operating system 264, and vice versa.

The system 202 may also include a radio interface layer 272 that performs the function of transmitting and receiving radio frequency communications. The radio interface layer 272 facilitates wireless connectivity between the system 202 and the "outside world," via a communications carrier or service provider. Transmissions to and from the radio interface layer 272 are conducted under control of the operating system 264. In other words, communications received by the radio interface layer 272 may be disseminated to the application programs 266 via the operating system 264, and vice versa.

The visual indicator 220 may be used to provide visual notifications, and/or an audio interface 274 may be used for producing audible notifications via the audio transducer 225 (as described in the description of mobile computing device 200). In the illustrated example, the visual indicator 220 is a light emitting diode (LED) and the audio transducer 225 is a speaker. These devices may be directly coupled to the power supply 270 so that when activated, they remain on for a duration dictated by the notification mechanism even though the processor 260 and other components might shut down for conserving battery power. The LED may be programmed to remain on indefinitely until the user takes action to indicate the powered-on status of the device. The audio interface 274 is used to provide audible signals to and receive audible signals from the user. For example, in addition to being coupled to the audio transducer 225 (shown in FIG. 2A), the audio interface 274 may also be coupled to a microphone to receive audible input, such as to facilitate a telephone conversation. In accordance with examples of the present invention, the microphone may also serve as an audio sensor to facilitate control of notifications, as will be described below. The system 202 may further include a video interface 276 that enables an operation of an on-board camera 230 to record still images, video stream, and the like.

A mobile computing device 200 implementing the system 202 may have additional features or functionality. For example, the mobile computing device 200 may also include additional data storage devices (removable and/or non-removable) such as, magnetic disks, optical disks, or tape. Such additional storage is illustrated in FIG. 2B by the non-volatile storage area 268.

Data/information generated or captured by the mobile computing device 200 and stored via the system 202 may be stored locally on the mobile computing device 200, as described above, or the data may be stored on any number of storage media that may be accessed by the device via the radio 272 or via a wired connection between the mobile computing device 200 and a separate computing device associated with the mobile computing device 200, for example, a server computer in a distributed computing network, such as the Internet. As should be appreciated such data/information may be accessed via the mobile computing device 200 via the radio 272 or via a distributed computing network. Similarly, such data/information may be readily transferred between computing devices for storage and use according to well-known data/information transfer and storage means, including electronic mail and collaborative data/information sharing systems.

FIG. 3 illustrates one example of the architecture of a system for providing an application that reliably accesses target data on a storage system and handles communication failures to one or more client devices, as described above. The system of FIG. 3 may be an exemplary system configured for processing that extends functionality of an exemplary learning management application. Target data accessed, interacted with, or edited in association with programming modules 108 and/or applications 120 and storage/memory (described in FIG. 1) may be stored in different communication channels or other storage types. For example, various documents may be stored using a directory service 322, a web portal 324, a mailbox service 326, an instant messaging store 328, or a social networking site 330, application 128, IO manager 124, other utility 126, and storage systems may use any of these types of systems or the like for enabling data utilization, as described herein. A server 320 may provide storage system for use by a client operating on general computing device 102 and mobile device(s) 200 through network 315. By way of example, network 315 may comprise the Internet or any other type of local or wide area network, and a client node may be implemented for connecting to network 315. Examples of a client node comprise but are not limited to: a computing device 102 embodied in a personal computer, a tablet computing device, and/or by a mobile computing device 200

(e.g., mobile processing device). As an example, a client node may connect to the network 315 using a wireless network connection (e.g. WiFi connection, Bluetooth, etc.). However, examples described herein may also extend to connecting to network 315 via a hardwire connection. Any of these examples of the client computing device 102 or 200 may obtain content from the store 316.

FIG. 4 is an exemplary method 400 related to assignment media creation on a client device with which aspects of the present disclosure may be practiced. As an example, method 400 may be executed by an exemplary processing device and/or system such as those shown in FIGS. 1-3. In examples, method 400 may execute on a device comprising at least one processor configured to store and execute operations, programs or instructions. Operations performed in method 400 may correspond to operations executed by a system and/or service that execute computer programs, application programming interfaces (APIs), neural networks or machine-learning processing, among other examples. As an example, processing operations executed in method 400 may be performed by one or more hardware components. In another example, processing operations executed in method 400 may be performed by one or more software components. In some examples, processing operations described in method 400 may be executed by one or more applications/services associated with a web service that has access to a plurality of application/services, devices, knowledge resources, etc.

Method 400 begins at processing operation 402, where an exemplary learning management application is executed. As identified above, a learning management application is an application/service that manages content for educational purposes. An exemplary learning management application may be associated with (or an extension of) a learning management system. A learning management application may be retrieved from a platform resource such as an application store. In other examples, devices may be pre-loaded to include educational software including an exemplary learning management application. Execution (processing operation 402) of a learning management application may occur through one or more of: startup of a client device, detection of content within another application executing on a client processing device (e.g. where an exemplary learning management application is user activity launching the learning management application, among other examples. In examples, a learning management application may be executed (processing operation 402) on a client device, which may include but is not limited to: a mobile phone, tablet, laptop, personal computer (PC) and wearable processing devices, among other examples. Examples of user interface views of an exemplary learning management application are shown in FIGS. 5A-5E and explained in the accompanying description.

The learning management application may be associated with one or more user accounts. A user account (of an individual user or group of users) may comprise any information identifying a user including information obtained from one or more of: resources of a platform that may be associated with an exemplary learning management application or third-party services. A user account may further be associated with one an exemplary distributed network storage service. In some examples, the user account may be specifically created for educational purposes, where the learning management application may interface with a distributed network storage service for the participant in.

In any example, a distributed network storage service may maintain, among other user data, educational data that corresponds to one or more courses/classes that a user may be involved in. An example of a distributed network storage service is Microsoft OneDrive®. In one example, a distributed network storage service may maintain one or more folders for educational data including assignment media that may be generated for completing assignments in a particular course/class. Assignment media may be any type of content that is created for educational purposes. Exemplary assignment media may be a document (e.g. assignment document) created from existing content that may not already be affiliated with a learning management system/application. For ease of explanation, examples described herein may reference an assignment document. However, one skilled in the art that understands the present disclosure should recognize that any type of media (e.g. images, audio files, etc.) can be affiliated with the examples described herein.

The learning management application may interface with the distributed network storage service for management of assignment media created by a user account. When a new assignment document is created, the learning management application may interface with the distributed network storage service to associate the assignment document with a folder (e.g. for a team/class or general education folder) of the distributed network storage service. In some examples, such processing occurs automatically based on a configuration of the learning management application. In other examples, the learning management application is configured to enable the user to assign a document to a particular location (e.g. folder of distributed network storage service) when a document is being created.

Flow of method 400 may proceed to processing operation 404, where content is accessed. Content may comprise any type of data including but not limited to: an email message, a text message, social networking content, a photo, an audio file, a hyperlink, and handwritten input, among other examples. In examples, content may be data in an application/service other than a learning management system/application. As an example, a user may receive an email message from a professor or a student that is provided in an email application. The content of such an email message may be pertinent to an assignment for coursework of a class that the user is a participant in. However, that content is provided in a means that is external to a learning management system/application. Typically, users would have to manually import content from one application (e.g. email application) to a learning management system in a case where content is provided through another medium. This process may include numerous steps just to associate content with a learning management system/application before even creating a document from the content. Examples described herein enable users such as students to take charge of assignment media creations from any type of content that is being accessed, where an exemplary learning management application improves processing efficiency and user experience when creating assignment media for educational purposes.

In one example, access (processing operation 404) to content may comprise executing an application that comprises content that a user intends to associate with an exemplary assignment document. Processing operation 404 may comprise viewing content in an application/service other than a learning management system/application. For instance, a native application for emails or text messages may be used to view respective examples of content. An exemplary learning management application is configured to interface with an exemplary productivity application, for example, to detect active applications and/or content within applications. In one example, such processing may occur through one or more application programming interfaces (APIs) that can associate an exemplary learning management application with other applications/services, for instance, which may be executing on a computing device. In some examples, access (processing operation 404) may comprise selection of a particular portion of content from an application/service. For example, a user may be viewing a web page through a web browsing application/service and select a portion of text from a viewed webpage.

In at least one example, an interaction between a learning management application and another application may be visible to a user, where content from another application is viewable within a portion of the user interface for the learning management application. For instance, the learning management application may detect an application that is executing in a foreground of a device operating system. A user may switch display to the learning management application, where at least a portion of content from the detected application may be displayed in the learning management application. In another example, a document may be viewed in a particular productivity application. In examples where functionality of the productivity application is extended to include capabilities associated with an exemplary learning management application and the learning management application is active, the learning management application may be configured to appear over (e.g. overlay) the productivity application without completely obscuring content displayed within the productivity application.

Flow may proceed to processing operation 406, where a request is received for creating a media (e.g. assignment media) from accessed content. An exemplary media may be an assignment document as described above. In one example, a request to create media may be received through an exemplary learning management application that is executing on a computing device. A request may be received through a user interface feature of a learning management application. Examples related to a request for creation of an exemplary assignment media are provided in the description of FIGS. 5A-5E and illustrated in the accompanying figures.

In some examples, a user may already be accessing content that is unassociated or unaffiliated with a learning management application (refer to processing operation 404). In alternative examples, a request for media creation may be received (processing operation 406) through a learning management application before content is being accessed in another application. In such a case, a user, through the learning management application, may be directed to identify content from another application/service that the user wishes to utilize for creation of an exemplary assignment media.

In another example, a request for media creation may be received (processing operation 406) through an application that is being used to access content (e.g. productivity application). As identified in subsequent examples described herein, an executing learning management application can extend its functionality to productivity applications that may be utilized to access and/or view content. User interface features associated with an exemplary learning management application may be incorporated into a productivity, for example, enabling a user to request creation of an assignment media from content being accessed. User interface features within a productivity application enable the productivity application to communicate with an exemplary learning management application, for example, when providing data (including accessed content) for the creation of an assignment media.

In response to receiving a request to create an exemplary assignment media, flow may proceed to operation 408, where an exemplary assignment media is created. In one example, an assignment media may be created by the learning management application, for example, based on an analysis of the content from another application/service. Examples related to a request for creation of an exemplary assignment media are provided in at least the description of FIGS. 5A-5E and illustrated in the accompanying figures. Operations executed by a learning management application related to creation (processing operation 408) of an assignment media may include collection of information from a user that is pertinent to document creation (e.g. type of document, content to incorporate, how to view the document, where to store the document, etc.).

In creating (processing operation 408) the assignment media, the learning management application automatically associates the assignment media with a user account of the learning management application and a distributed network storage that corresponds with the user account. The distributed network storage is storage assigned by an exemplary distributed network storage service. An exemplary learning management application interfaces with a distributed network storage service to create a copy (e.g. cloud copy) of the media that is stored and accessible on a storage provided over a distributed network. A user can access a copy of the assignment media via a network connection. In some examples, creation (processing operation 408) of an assignment media creates a local copy of a media that is stored on a processing device. One skilled in the art that understands the present disclosure should recognize that a local copy of an assignment media can be synchronized with a copy maintained by a distributed network storage. In some examples, a user may designate where to store a created assignment document, for example, by selecting a folder of a distributed network storage or a folder stored locally on a processing device. In one example, a folder may be an educational folder of a distributed network storage, where the educational folder may be associated with a user account and one or more specific classes/courses.

In creating (processing operation 408) an assignment media, an exemplary learning management application incorporates one or more portions of the accessed content within the created assignment media. As identified above, the learning management application may interface with one or more active productivity applications to analyze active applications and detect content from of an application that can be used to create an assignment media. In some examples, a user may select content that can be used to create an assignment media. In at least one example, a user may specify that accessed content (or portions of the accessed content) are to be used to create an exemplary assignment document. In some examples, multiple types of content (e.g. content in different forms/different applications) may be identified and used to create an exemplary assignment media. That is, a first portion of content may be retrieved from a first application and a second portion of content may be retrieved from a different application, where both of the first and second portions may be analyzed when creating an exemplary assignment document.

In analyzing accessed content, the learning management application may interface with one or more application resources other than the learning management application. For instance, application resources may be associated with a platform that provides the exemplary learning management application. In some examples, the learning management application may also interface with application resources that are external to an exemplary platform, for example, third-party applications/services that can assist with analysis of content. Application resources may assist with analysis of content for the creation of an assignment document including processing operations such as: parsing, extraction, language understanding processing, recommendations for content, image processing, optical character recognition, calendar/scheduling, speech and text recognition, modification of content (e.g. correction, cropping, quality-adjustment, etc.). As an example, consider a case where a student take a photo of a question presented on a whiteboard. The photo may be accessed and used to create an assignment document for responding to the question. In doing so, the learning management application may interface with application resources to utilize the resources for image processing, optical character recognition, text recognition processing, etc. of the photo. A created assignment document may include the photo embedded within the created document and/or portions of content determined from the photo (e.g. the question for an assignment).

In further examples, the learning management application may further utilize application resources to provide additional information within a created assignment media. Contextual recommendations for analyzed content may be included when creating (processing operation 408) an exemplary assignment media, for example, based on analysis of accessed content. Consider the above example, where a photo from a whiteboard (presenting an in-class question) is being analyzed. In that instance, analysis of the photo (e.g. through optical character recognition and text recognition processing) may identify a context of a question, and provide recommended content/resources that may be useful for answering the question.

In further examples, recommendations may be provided for sharing a created assignment media with other users (e.g. students of a class/team). Recommendations may also be provided for incorporation of additional information that may be useful for completion of an assignment (e.g. due date for an assignment, information cross-referenced from a learning management system/application, calendar application, social networking application, etc.). In some examples, recommended content may be automatically included when an assignment media is created. In other examples, users may be able to toggle settings of a learning management application (or alternatively provide indication) as to whether recommended content should be included in a created assignment media.

Once an assignment media is created, flow may proceed to processing operation 410 where a created assignment media may be accessed. As an example, an icon for a created assignment media may be automatically provided through the learning management application. Access (processing operation 410) to a created assignment media may be provided based on a selection of an icon for a created assignment media, for example, within a learning management application (or through a distributed network storage). Examples related to a displaying an icon for a created assignment media as well as selection of an icon for access to the created assignment media are further provided in at least the description of FIGS. 5A-5E and illustrated in the accompanying figures. In alternative examples, the learning management application may be configured to automatically access and display an assignment media upon creation. In other examples, a preview of a created assignment media may be displayed, for example, where the preview may be selectable for the user to access a full version of the assignment media.

Flow may proceed to processing operation 412, where a created assignment media is displayed. As an example, a created assignment media may be displayed based on selection of an icon associated with the created assignment media or based on creation of an assignment media, among other examples. For instance, a user may tap on an icon associated with a created assignment document. Displaying (processing operation 412) of a created assignment document may comprise displaying the created assignment document in a productivity application executing on a computing device. For example, a user may select to create the assignment document in a word processing application, where display (processing operation 412) of the created assignment document opens the assignment document in the word processing application. Display of the created assignment document may further comprise displaying one or more portions of content for the created assignment document.

In some examples, a user (or users) may update a created media or a status designation (e.g. complete, incomplete, under review, submitted, etc.) associated with a created assignment media. In examples where assignment media is updated, flow may proceed to update (processing operation 414) a created media or status designation based on user direction. Status designations may comprise indications of a state for assignment media, where a status indication may include but is not limited to one of: complete/done, draft, incomplete, submitted and shared, among other examples. In one example, the learning management application may be configured to enable a user to customize a status indication. Access to created documents may also be shared with other users, where updates to a created document may occur remotely at different times. In some instances, status indications may be provided by other users.

Flow of method 400 may proceed to decision operation 416, where it is determined whether a created assignment media is to be submitted. User interface features related to submission of an exemplary assignment media are provided in FIGS. 5A-5E and FIG. 6 and the accompanying description. However, one skilled in the art that understands the present disclosure should recognize that assignment media may be submitted through other associated means including through the distributed network storage or other application/services.

In some examples, a learning management application may be configured to confirm a status designation of the created assignment media before submission. For instance, decision operation 416 may confirm that an assignment media is marked as complete, done, etc., which provides confirmation that the media is ready to be submitted when a user selects to submit an assignment media. This may provide a check to make sure the user actually intends to submit an assignment document, helping to minimize inadvertent submission.

The learning management application may be configured to provide user interface features that enable a user to toggle a status designation of an assignment media. In alternative examples, the learning management application may be further configured to enable users to pre-set submission of a created assignment document by a certain deadline. In some cases, the user can choose to submit an assignment document even if the assignment document has not been marked as complete/done etc. This may be useful to make sure at least some form of the assignment is submitted by a required deadline.

In examples where a status designation is utilized to identify that assignment media is ready for submission and the media is not identified as being complete, flow branches NO and proceeds to processing operation 418, where a user may be notified to update a status of an assignment media. In examples, notification may be provided (processing operation 418) through the learning management application. In a case where a notification is provided (processing operation 418), processing of method 400 may return back to processing operation 414, where a user may update a status designation of an assignment media.

In examples where it is determined (at decision operation 416) that assignment media is ready to be submitted, flow branches YES and proceeds to processing operation 420, where the assignment media is submitted. In one example, the assignment media is created by a same user that submits the created assignment media for evaluation. In this way, a student is provided with autonomy over assignment creation and submission, which is typically not provided other learning management systems. In one example, a created assignment media may be submitted (processing operation 420) through the learning management application. In such an instance, a user interface feature of the learning management application may be selected (or an action provided by a user) indicating to submit a created media such as a document. In alternative examples, a created assignment media may be submitted through a productivity application (e.g. that may be used for displaying the document). In such an example, submission (processing operation 420) of a created assignment media through a productivity application may comprise receiving a selection of a user interface feature associated with the learning management application, where the user interface feature is incorporated into an application command control for the productivity application.

In some examples, an exemplary learning management application is configured to provide a preview of assignment media before transmitting the media for submission. In such an example, a user is afforded a chance to review an assignment document before submission. The learning management application may be configured to require the user to confirm submission of an assignment document after presentation of a preview.

In alternative examples, method 400 may be implemented by one or more components connected over a distributed network. For instance, a learning management system/application may be provided as a service, where a user can utilize a client device to remotely connect to the learning management system/application. In such an example, a user may be accessing the learning management service using a client device. Creation of an exemplary assignment media may occur at one or more devices associated with a distributed network. For example, computing devices in a cloud-based networking configuration may create and manage access to an exemplary assignment document. For instance, a copy of a created assignment document may be generated and maintained at a storage associated with a distributed network storage service. Access to the created assignment media may be provided, for example, to client devices that may be executing an exemplary learning management application which is associated with a learning management service. An exemplary learning management service may provide management updates for access to and modification of assignment media. Further, an exemplary learning management service may also provide updates related to status designations of created assignment media.

FIGS. 5A-5E provide user interface views (500-550) for an exemplary learning management application with which aspects of the present disclosure may be practiced.

Figure 5A:
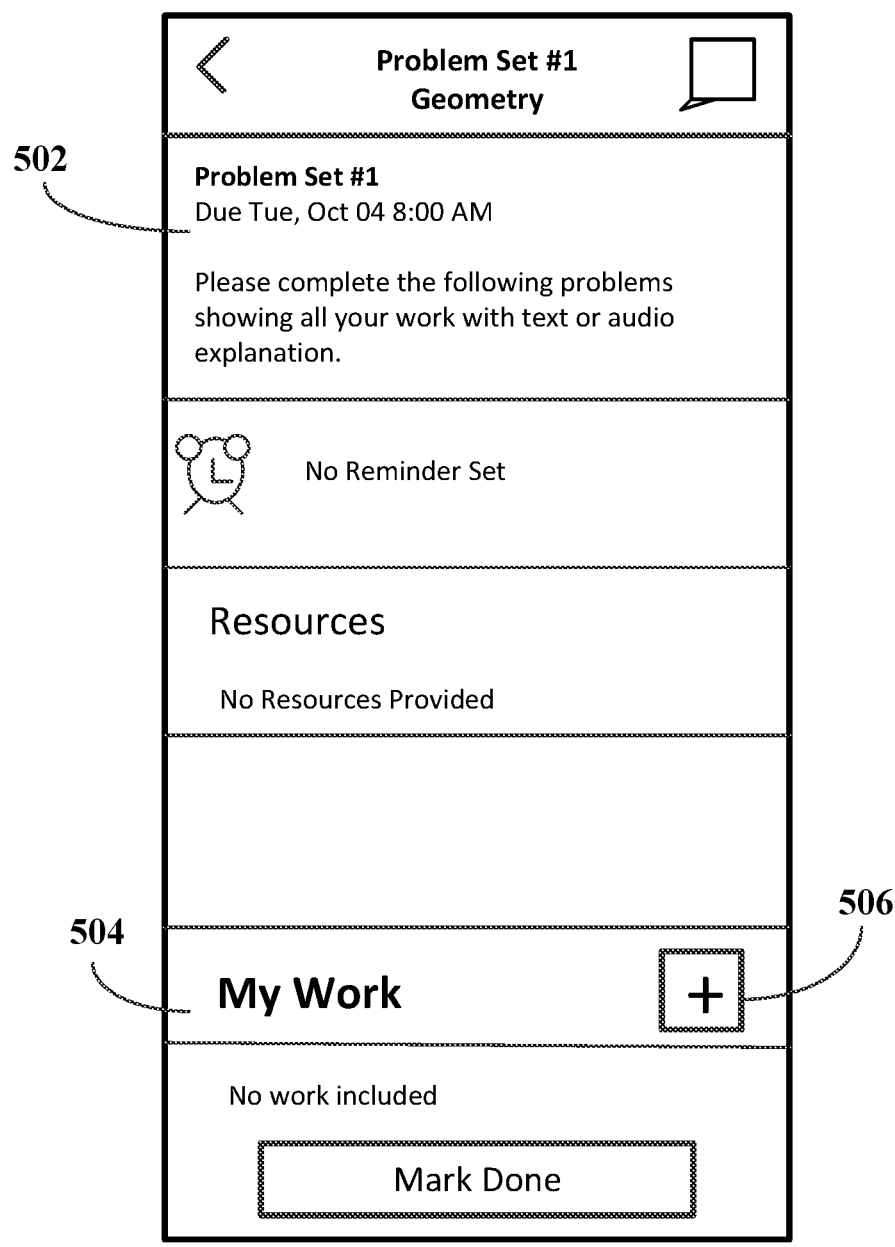

FIG. 5A presents user interface view 500 illustrating a portion of a user interface of an exemplary learning management application. An exemplary learning management application/service has been described in the foregoing. A user interface of a learning management application may be configured to provide a number of user interface features. In providing user interface features, the learning management application may be configured to interface with other application resources that may be utilized to extend functionality of the learning management application. Among other examples, user interface features may include functionality including but not limited to: reminders, alarms, contacts/address book, direct access to application resources, recommended content, status designations, access to created documents, profile information, settings and application command control, etc. As identified above, an exemplary learning management application may be associated with a user account, that can be utilized to personalize and customize a user experience.

User interface view 500 comprises user interface feature 502. User interface feature 502 provides display of exemplary content that can be used to create assignment media (e.g. assignment document). The learning management application is configured to enable a user to create an assignment document (e.g. for educational purposes) from content of different application. Examples for detection of executing applications and content of such applications including alternate examples for presentation of the learning management application have been described in the foregoing. In other examples, content may be imported into the learning management application from a client device.

User interface feature 504 is configured to provide a listing of created assignment media that pertain to a user (e.g. "My Work"), which may be assigned with courses/classes. The learning management application may also be configured to enable users to import content and/or associations. As can be seen in user interface view 500, no work is associated with user interface feature 504. A user may select user interface feature 506 (e.g. "+") to initiate processing for creation of a new document using the learning management application.

Figure 5B:
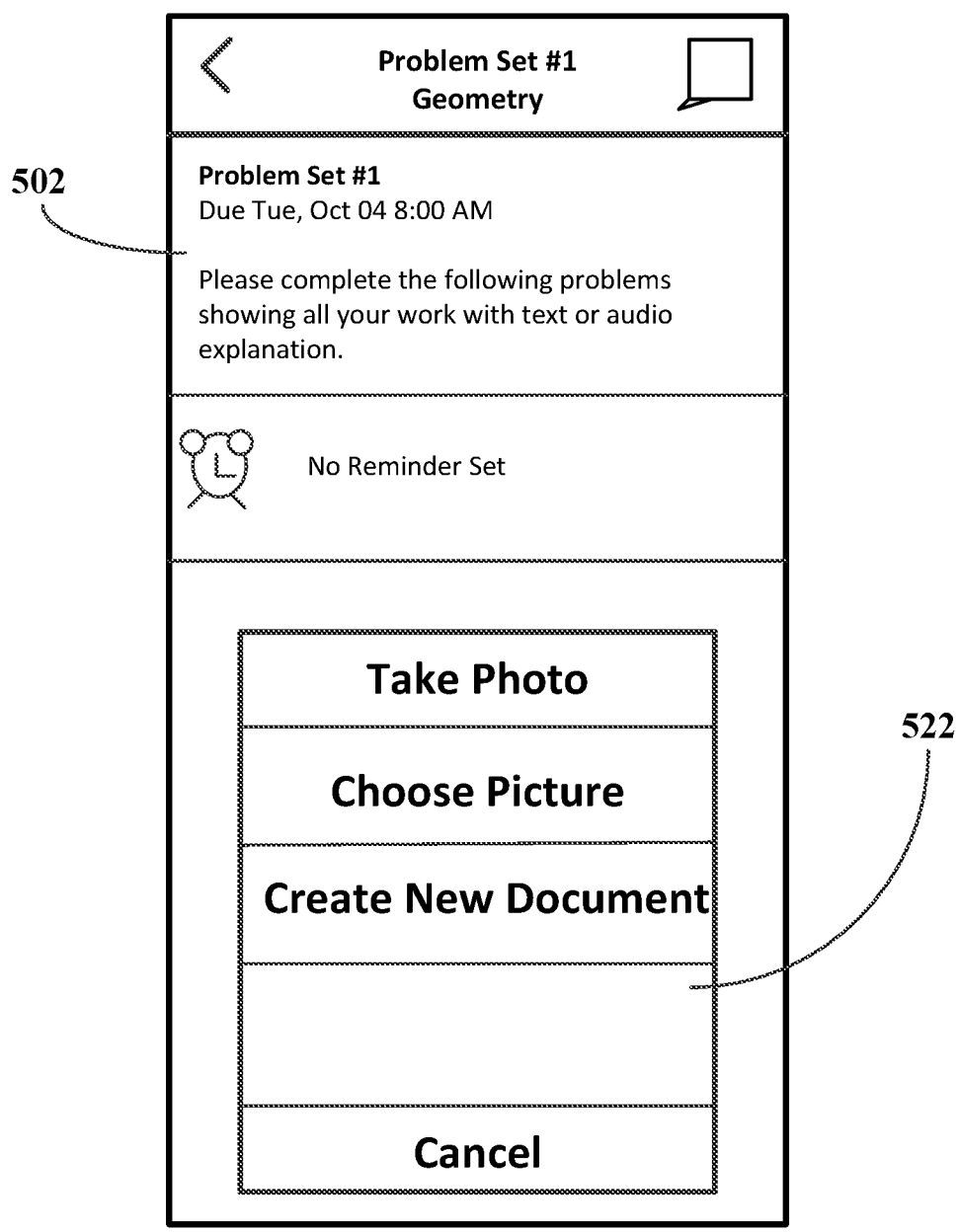

FIG. 5B presents user interface view 520 illustrating a portion of a user interface of an exemplary learning management application. User interface view 520 presents a result of selection of user interface feature 506 described in FIG. 5A. Selection of user interface feature 506 triggers display of user interface feature 522. User interface feature 522 is configured to provide selectable options for adding content to a learning management application. For example, a user can choose to access functionality associated with a computing device (e.g. take a photo), select content to use for creation of a document (e.g. choose a picture) or choose to create a new document (e.g. from existing content), among other examples. As an example, a user may select an option for media creation (e.g. "create new document").

Figure 5C:
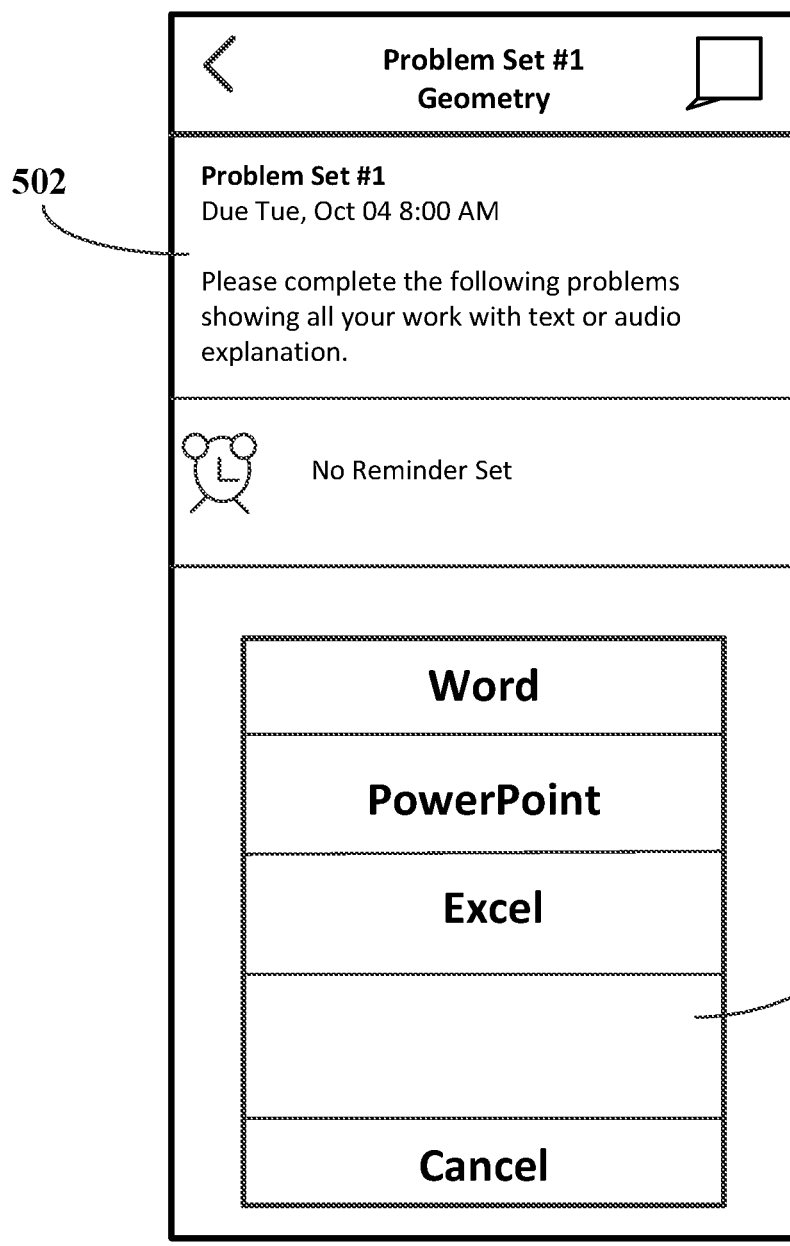

FIG. 5C presents user interface view 530 illustrating a portion of a user interface of an exemplary learning management application. User interface view 530 presents a result of selection of an option to create a new document, which is made through user interface feature 522 described in FIG. 5B. Selection of an option to create a new document (provided in user interface feature 522) triggers display of user interface feature 532. User interface feature 532 is configured to provide options for selecting a type of document a user would like to create. One skilled in the art that understands the present disclosure should recognize that the options for document creation that are presentable to a user are not limited to those shown in user interface view 530. As an example, a user may select an option to create a document in a word processing application (e.g. "Word").

FIG. 5D presents user interface view 540 illustrating a portion of a user interface of an exemplary learning management application. User interface view 540 presents a result of selecting to create a document in a word processing application. As can be seen in user interface view 540, the learning management application is updated to include a newly created document under user interface feature 504 (described in FIG. 5A). A reference 542 for the newly created document is shown in user interface view 540. The reference 542 may be selectable for access to the document. In examples, a learning management application may be configured to automatically update user interface feature 504 when new documents are created/added. As an example, may enter an input selecting the reference 542, for example, through a tap action, device selection, spoken utterance, etc.

Figure 5E:
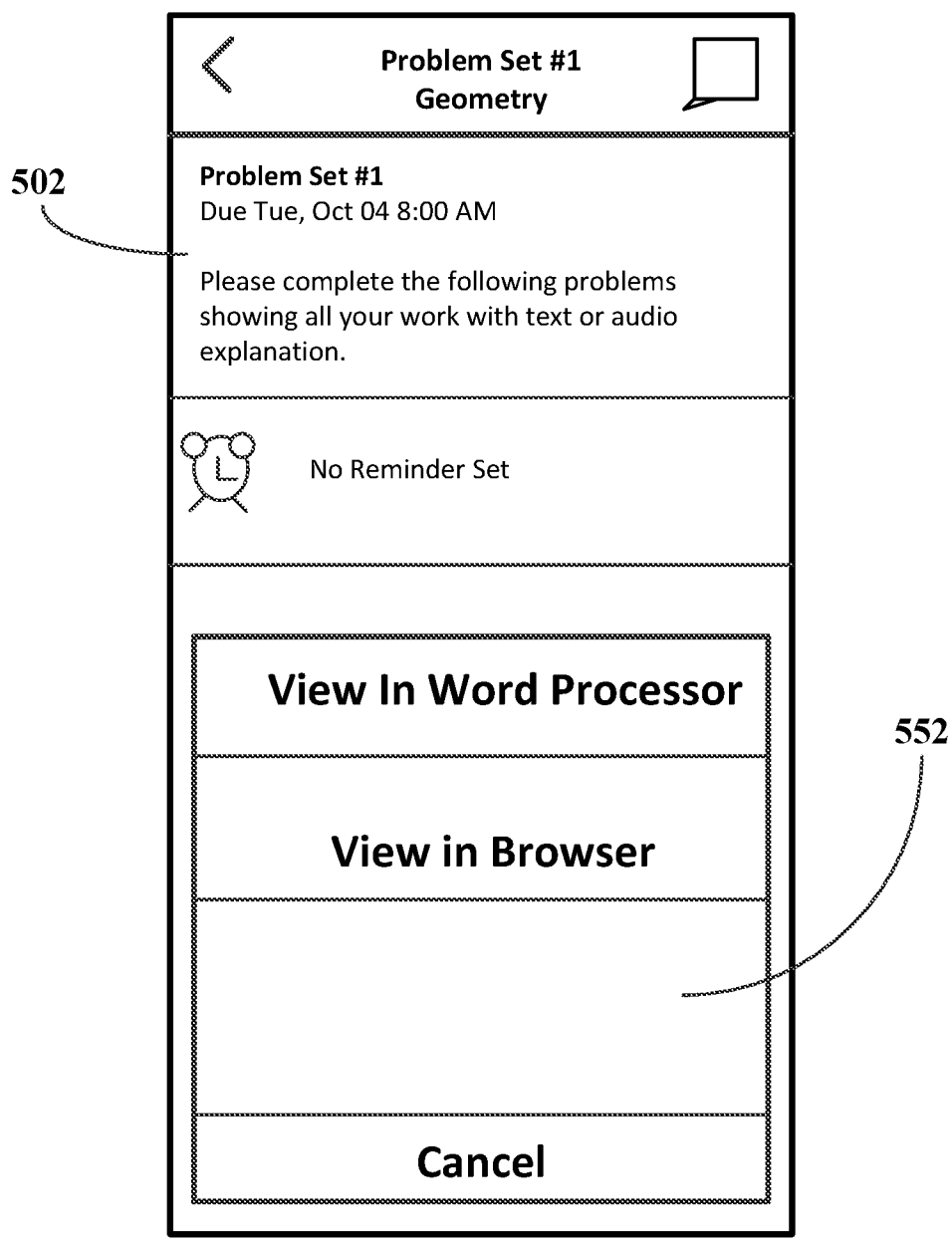

FIG. 5E presents user interface view 550 illustrating a portion of a user interface of an exemplary learning management application. User interface view 550 presents a result of selection of reference 542. Selection of reference 542 triggers display of user interface feature 552. User interface feature 552 is configured to provide options for how to view a selected document. One skilled in the art that understands the present disclosure should recognize that the options presentable for document viewing are not limited to those shown in user interface feature 552. As an example, a user may select an option to view the document in a word processing application) or a browser application. A productivity application associated with the document (e.g. word processing application) may be launched to display the created document based on selection of a method for viewing a document.

Figure 6:
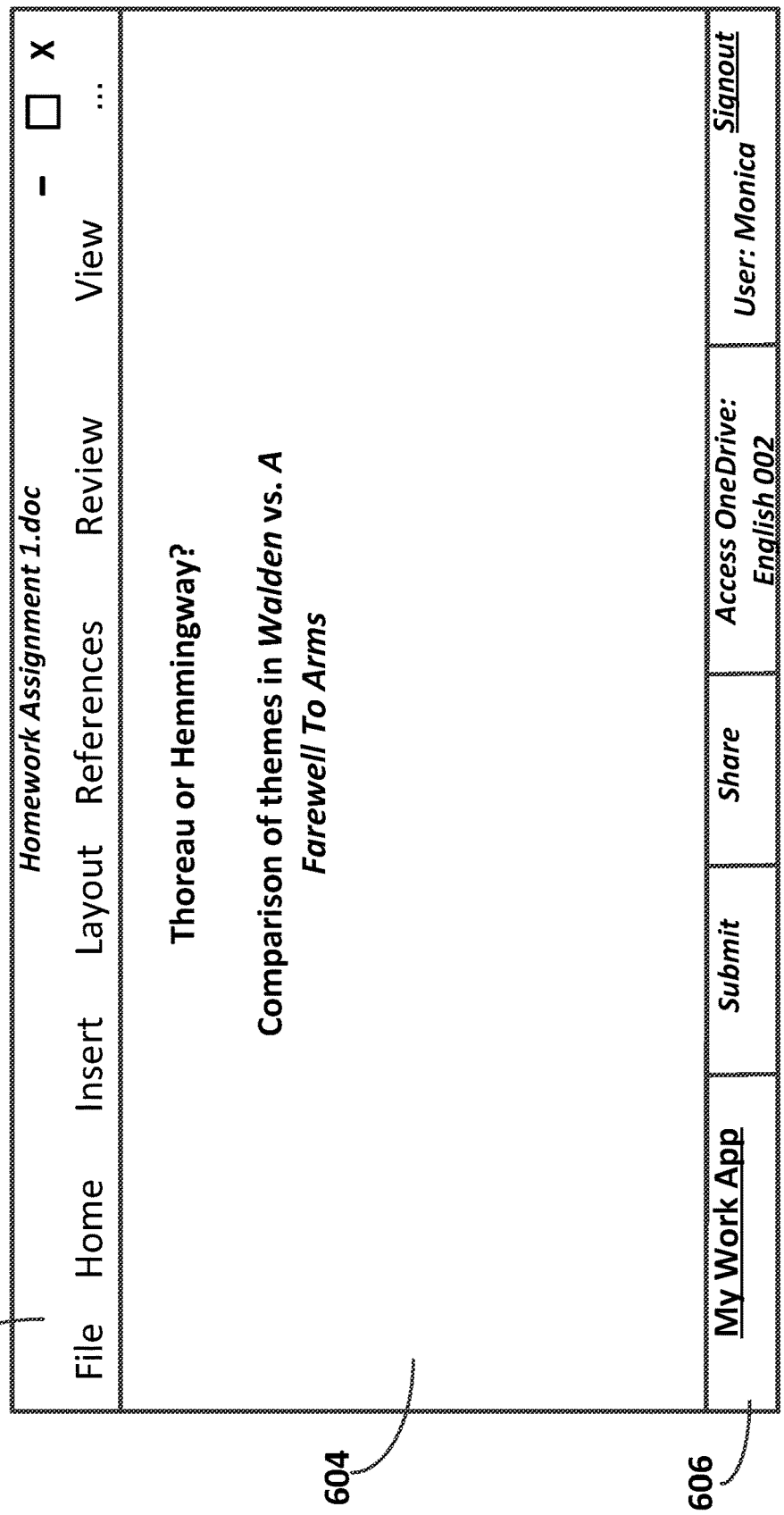
FIG. 6 provides an exemplary user interface view of a productivity application that comprises functionality of an exemplary learning management application which aspects of the present disclosure may be practiced.

FIG. 6 provides an exemplary user interface view 600 of a productivity application that comprises functionality of an exemplary learning management application which aspects of the present disclosure may be practiced. Examples of productivity applications have been provided in the foregoing. User interview view 600 provides display of an exemplary assignment document, which is being displayed in a word processing application. User interface view 600 comprises display of the productivity application 602 (and associated application command control), a canvas 604 of the productivity application (e.g. for displaying content) and learning management application command control 606. As described previously, command control for a productivity application can be extended to include command control options for an exemplary learning management application. As an example, a user may select (e.g. through a learning management application) to access a created assignment document. Functionality associated with managing a created assignment document is provided through learning management application command control 606. Examples of user interface features associated with a learning management application command control 606 may comprise but are not limited to: submission of documents, sharing of access to documents, management of class/courses and/or storage of documents, user account information, management of status designations and settings/controls, among other examples. One skilled in the art that understands the present disclosure should recognize that user interface features of the learning management application command control 606 are not limited to those shown in user interface view 600.

Reference has been made throughout this specification to "one example" or "an example," meaning that a particular described feature, structure, or characteristic is included in at least one example. Thus, usage of such phrases may refer to more than just one example. Furthermore, the described features, structures, or characteristics may be combined in any suitable manner in one or more examples.

One skilled in the relevant art may recognize, however, that the examples may be practiced without one or more of the specific details, or with other methods, resources, materials, etc. In other instances, well known structures, resources, or operations have not been shown or described in detail merely to observe obscuring aspects of the examples.

While sample examples and applications have been illustrated and described, it is to be understood that the examples are not limited to the precise configuration and resources described above. Various modifications, changes, and variations apparent to those skilled in the art may be made in the arrangement, operation, and details of the methods and systems disclosed herein without departing from the scope of the claimed examples.

What is claimed is:

1. A method comprising:
    detecting through a learning management application, access to content presented in an application or service that is external to the learning management application;
    receiving, through the learning management application executing on the computing device, an input requesting creation of an assignment media, wherein the input request is submitted by a student user account that is associated with the learning management application;
    creating the assignment media based on the received input, wherein the creating automatically inserts one or more portions of the accessed content into the assignment media based on the detected access to the content;
    accessing, through the learning management application, the created assignment media; and
    displaying the created assignment media.

2. The method of claim 1, wherein the accessed content is content that has not previously been associated as an assignment in the learning management application.

3. The method of claim 1, further comprising: automatically associating, through the learning management application, the detected access to the content with the received input requesting creation of the assignment media.

4. The method of claim 3, wherein the automatically associating of the detected access with the received input further comprises analyzing the accessed content using one or more application resources associated with a platform, and wherein insertion of the one or more portions of accessed content is determined based on an analysis of the access to the content using the one or more application resources.

5. The method of claim 1, wherein the accessed content comprises one or more selected from a group consisting of: an email message, a text message, social networking content, a photo, an audio file, a hyperlink, and handwritten input.

6. The method of claim 1, wherein the received input requesting creation of the assignment media comprises a selection, through the learning management application, of a document type for the assignment media.

7. The method of claim 1, wherein the creating automatically associates the assignment media with the student user account of the learning management application and a distributed network storage that corresponds with the student user account.

8. The method of claim 1, further comprising: submitting, through the learning management application, the created assignment media for evaluation, wherein the assignment media is created by a same user that submits the created assignment media for evaluation.

9. The method of claim 1, further comprising: submitting, through a productivity application, the created assignment media for evaluation, wherein the submitting further comprises receiving selection of a user interface feature associated with the learning management application, and wherein the user interface feature is incorporated into an application command control for the productivity application.

10. A system comprising:
   at least one processor; and
   a memory operatively connected with the at least one processor storing computer-executable instructions that, when executed by the at least one processor, causes the at least one processor to execute a method that comprises:
   detecting, through a learning management application executing on the system, access to content presented in an application or service that is external to the learning management application;
   receiving, through the learning management application, an input requesting creation of an assignment media, wherein the input request is submitted by a student user account that is associated with the learning management application;
   creating the assignment media based on the received input, wherein the creating automatically inserts one or more portions of the accessed content into the assignment media based on the detected access to the content;
   accessing, through the learning management application, the created assignment media; and
   displaying the created assignment media.

11. The system of claim 10, wherein the accessed content is content that has not previously been associated as an assignment in the learning management application.

12. The system of claim 10, wherein the method, executed by the at least one processor, further comprises: automatically associating, through the learning management application, the detected access to the content with the received input requesting creation of the assignment media.

13. The system of claim 12, wherein the automatically associating of the detected access with the received input further comprises analyzing the accessed content using one or more application resources associated with a platform, and wherein insertion of the one or more portions of accessed content is determined based on an analysis of the access to the content using the one or more application resources.

14. The system of claim 10, wherein the accessed content comprises one or more selected from a group consisting of: an email message, a text message, social networking content, a photo, an audio file, a hyperlink, and handwritten input.

15. The system of claim 10, wherein the received input requesting creation of the assignment media comprises a selection, through the learning management application, of a document type for the assignment media.

16. The system of claim 10, wherein the creating automatically associates the assignment media with the student user account of the learning management application and a distributed network storage that corresponds with the student user account.

17. The system of claim 10, wherein the executed method further comprises: submitting, through the learning management application, the created assignment media for evaluation, and wherein the assignment media is created by a same user that submits the created assignment media for evaluation.

18. The system of claim 10, wherein the executed method further comprises: submitting, through a productivity application, the created assignment media for evaluation, wherein the submitting further comprises receiving selection of a user interface feature associated with the learning management application, and wherein the user interface feature is incorporated into an application command control for the productivity application.

19. A method comprising:
   receiving, through a learning management application executing on a computing device, a request to create an assignment media;
   automatically associating the received request with access to content in an application or service, simultaneously executing on the computing device, that is external to the learning management system;
   creating the assignment media based on the received request, wherein the creating automatically inserts one or more portions of the content, accessed in the application or service, into the assignment media based on an automatic association with the received request to create the assignment media; and
   providing access to the created assignment media through the learning management application.

20. The method of claim 19, wherein the content accessed is content that has not previously been associated as an assignment in the learning management application, wherein the automatically associating of the detected access with the received input further comprises analyzing the accessed content using one or more application resources associated with a platform, and wherein insertion of the one or more portions of the content is determined based on an analysis of the access to the content using the one or more application resources.

* * * * *